(12) United States Patent
Nikonov (10) Patent No.: US 6,522,812 B1
(45) Date of Patent: Feb. 18, 2003

(54) METHOD OF PRECISION FABRICATION BY LIGHT EXPOSURE AND STRUCTURE OF TUNABLE WAVEGUIDE BRAGG GRATING

(75) Inventor: Dmitri E. Nikonov, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/024,912

(22) Filed: Dec. 19, 2001

(51) Int. Cl.[7] .................................................. G02B 6/34

(52) U.S. Cl. ............................................ 385/37; 65/385

(58) Field of Search ............................... 385/31–37, 41, 385/147, 38, 27, 43, 39, 123, 125; 359/3, 34, 566; 65/385, 402, 403, 406, 410, 412, 415, 435, 447

(56) References Cited

U.S. PATENT DOCUMENTS

| | | | | |
|---|---|---|---|---|
| 5,805,751 A | * | 9/1998 | Kewitsch et al. ............. | 385/37 |
| 6,005,992 A | * | 12/1999 | Augustsson et al. .......... | 385/10 |
| 6,298,183 B1 | * | 10/2001 | Yamauchi et al. ............ | 385/37 |
| 6,298,699 B1 | * | 10/2001 | Gartner et al. ................ | 70/133 |
| 6,442,313 B2 | * | 8/2002 | Yamauchi et al. .......... | 385/123 |

OTHER PUBLICATIONS

Eldada, et al. "Thermooptic Planar Polymer Bragg Grating OADM's with Broad Tuning Range," *Photonics Technology Letters* 11(4):448–450 Apr. 1999.

Fardad, et al. "UV–light imprinted Bragg grating in sol–gel ridge waveguide with almost 100% reflectivity," *Electronics Letters* 33(12):1069–1070 Jun. 1997.

Giles, "Lightwave Applications of Fiber Bragg Gratings," *Journal of Lightwave Technology* 15(8):1391–1404, Aug. 1997.

Goh, et al."High–Extinction Ratio and Los–Loss Silica–Based 8 x 8 Strictly Nonblocking Thermooptic Matrix Switch," *Journal of Lightwave Technology* 17(7):1192–1199 Jul. 1999.

Hibino, et al. "Temperature–insensitive UV–induced Bragg gratings in silica–based planar lightwave circuits on Si," *Electronics Letters* 35(21):1844–1845, Oct. 1999.

Kashyap, et al. "Laser–Trimmed Four–Port Bandpass Filter Fabricated in Single–Mode Photosensitve Ge–Doped Planar Waveguide," *Photonics Technology Letters* 5(2):191–194, Feb. 1993.

Kitagawa, et al. "Single–frequency $Er^{3+}$–doped silica–based planar waveguide laser with integrated photo–imprinted Bragg reflectors," *Electronics Letters* 30(16):1311–1312 Aug. 1994.

Kohnke, et al. "Planar waveguide Mach–Zender bandpass filter fabricated with single exposure UV–induced gratings," *OFC '96 Technical Digest* p. 277.

(List continued on next page.)

*Primary Examiner*—Akm E. Ullah
(74) *Attorney, Agent, or Firm*—Marshall Gerstein & Borun (57) ABSTRACT

A method of fabricating a tunable waveguide Bragg grating is provided. The tunable Bragg grating is preferably formed through an ultra-violet (UV) exposure process is preferred. The tunable Bragg grating is formed in an optical substrate, and may be formed in a planar lightwave circuit (PLC). In the latter example, the PLC may include multiple waveguides within close proximity, and the methods described herein provide a way of shielding adjacent waveguides from exposure during the UV exposure process. The Bragg grating is made tunable in one example through a metallic heater layer disposed over a temperature tuned region that is in communication with the Bragg grating for tuning the operation of the Bragg grating in response to changes in a driving signal to the metallic heater.

30 Claims, 7 Drawing Sheets

OTHER PUBLICATIONS

Maxwell, et al. "UV Written 13 dB Reflection Filters in Hydrogenated Low Loss Planar Silica Waveguides," *Electronics Letters* 29(5):425–426, Mar. 1993.

Miya, "Silica–Based Planar Lightwave Circuits: Passive and Thermally Active Devices," *Journal of Selected Topics in Quantum Electronics* 6(1):38–45, Jan. 2000.

Okamoto, "Bringing Telecom Networks Up To Speed," *Circuits & Devices* 26–34 Sep. 1998.

Singh, et al. "Apodized Fiber Gratings for DWDM Using Variable Efficiency Phase Masks," pp. 76–77 (No date).

Takahashi, et al. "A 2.5 Gb/s, 4–Channel Multiwavelength Light Source composed of UV Written Waveguide Gratings and Laser Diodes Integrated on Si," *ECOC* 97:22–25 Sep. 1997.

White, "Integrated Components for Optical Add/Drop" (No date).

* cited by examiner

METHOD OF PRECISION FABRICATION BY LIGHT EXPOSURE AND STRUCTURE OF TUNABLE WAVEGUIDE BRAGG GRATING

FIELD OF THE INVENTION

The present invention relates generally to the fabrication of Bragg gratings and, more specifically, to the fabrication of Bragg gratings in optical waveguides.

BACKGROUND OF RELATED ART

Increasing demands are placed on communication networks as the number of customers grows and as the need to offer more complex services expands. In optical networks, for example, wavelength division multiplexing (WDM) is used to transmit the massive amounts of information passing through the optical network. WDM technology enables information to be transmitted through optical fibers and optical devices in bit streams, each superimposed on light of a different wavelength. A WDM system, for example, may have a single fiber communicating 256 channels, or individual signals, existing at 256 slightly different wavelengths, each channel representing a different user or information stream. To perform routing, switching, multiplexing, demultiplexing, and add/drop functions on these individual signals, wavelength-selective devices are used to selectively affect signals at different wavelengths.

Fiber Bragg gratings are often used in WDM optical networks to form wavelength-selective devices. Fiber Bragg gratings function as optical filters in which nearly all of the light within a desired narrow bandwidth range is filtered while nearly all of the light outside this range is transmitted. They have been used in place of interference-based filters like thin film filters and arrayed waveguides. Despite their use, fiber Bragg gratings do restrict optical network design and implementation.

Optical networks are notoriously difficult to achieve and slow to reconfigure. Reconfigurations, however, are desirable to add customers and services, as well as to manage traffic changes within the network. For example, it is desirable to have tunable components within an optical network that transmit or filter certain frequencies in a controllable manner. In other words, it is desirable to have a single tunable wavelength-selective device to replace multiple wavelength-selective devices. Single-device, fiber Bragg grating filters have been shown in which tuning is achieved by applying stress to the fiber or in which tuning is achieved by heating the fiber. These solutions are difficult to implement and limit optical device design and dimensions.

As an alternative to fiber-based filters and other optical devices, planar lightwave circuits (PLCs) are a class of similarly-formed optical devices used in WDM systems. PLC technology is advantageous because it can be used to form small-scale components, such as arrayed-waveguide grating (AWG) filters, optical add/drop (de)multiplexers (ADMs), optical switches, as well as hybrid opto-electronic integrated devices. Such devices formed with optical fibers would typically be much larger. Further, PLC structures can be batch fabricated on a silicon wafer, as well. Further still, with PLC technology, large-scale integration is theoretically achievable, i.e., the combination of numerous devices onto a single substrate or die similar to the large-scale integration common in microprocessor design. Unfortunately, using PLC technology to form a large-scale integrated optical chip has proved difficult, and one of the main problems arises with forming Bragg gratings on a PLC.

Two techniques have been shown for forming Bragg gratings on PLC waveguides: a semiconductor etching technique and an ultra-violet (UV) exposure technique. The former process is susceptible to grating periodicity errors in Bragg gratings of larger grating lines. Also, the former technique makes forming apodized gratings very difficult, though apodized gratings are highly desired for WDM systems because they offer better side lobe suppression of wavelengths outside of the grating resonant bandwidth range.

The more common method of forming Bragg gratings in PLC devices is through an UV exposure process in which a spatially periodic interference pattern is exposed on the fiber or waveguide. Though, increasingly more prevalent, this method is still unsatisfactory.

The UV spot sizes used during the UV exposure are quite large, at least 50 μm in diameter, and, as a result, a relatively large area of the PLC device is exposed during the UV exposure process. Any waveguides in the PLC device within the UV spot size will also be patterned during the exposure, an undesirable effect in many integrated optical devices. Thus, one avoids forming other waveguides near the waveguide in which the grating is to be formed. This limits the extent to which optical devices may be densely packed into a large-scale integrated optical chip. The problem also limits the fabrication of individual optical components. For example, with components formed of two waveguides within evanescent coupling contact, Bragg gratings cannot be written into one waveguide without writing a Bragg grating into the other.

Not only does the realization of Bragg gratings in PLC devices limit device size and complexity, thus far easily fabricated tunable Bragg gratings, though achievable in optical fibers, have not been shown in PLC devices. A common way to make silica waveguide circuits (often used in PLC fabrication) tunable is to place a metal heater directly above the waveguide. Changing the waveguide temperature via the heater causes a change in the refractive index of the waveguide, and this changes the optical path length of the waveguide, which in turn can be used to tune a waveguide device. A problem arises when trying to combine Bragg gratings with current thermal heaters.

In batch fabrication, the metal heaters are formed before the wafer of the PLC structure is cut, or diced, to allow easy metal deposition and etching of the metal layer. UV exposure is performed after the wafer is diced, because UV writing stages are too small to properly expose an entire wafer and because, in diced form, the individual dies may be placed in a hydrogen chamber to increase photosensitivity before the UV exposure step. Forming the metal heater directly above a waveguide before UV exposure, however, would prevent the formation of a Bragg grating on the waveguide, as the UV exposure radiation would be absorbed by the metal heater. As a result, easily fabricated tunable Bragg gratings have not been shown in PLC devices.

DETAILED DESCRIPTION OF AN EXEMPLARY EMBODIMENT

Provided are numerous methods, and structures formed from the same, that address the above-described problems. While preferred examples and numerous alternatives thereto are provided below, it will be appreciated by persons of ordinary skill in the art that these are exemplary in nature. The teachings herein may be used to form a great many optical waveguide devices having Bragg gratings, including optical devices formed by planar lightwave circuit processes and otherwise. Furthermore, while the approaches are described in the context of forming Bragg gratings during an UV exposure process, the teachings herein may be applied to other UV exposure processes in which UV exposure spot size has previously limited the density or close spacing of optical components.

Figure 1:
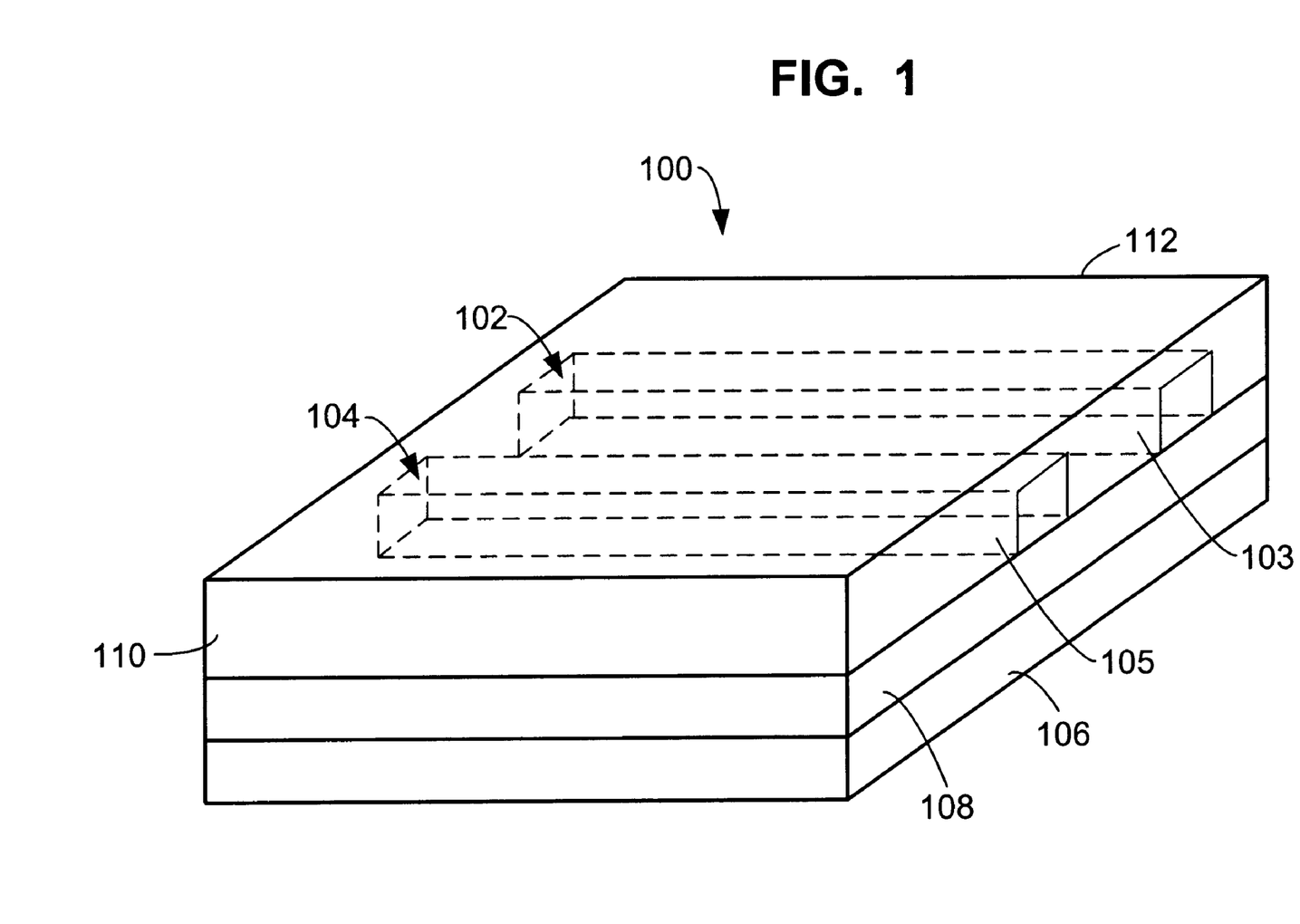
FIG. 1 is a view of an exemplary optical substrate having two waveguides.

An optical waveguide structure 100 is shown in FIG. 1. The optical structure 100 includes a first waveguide 102 and a second waveguide 104, which are preferably sized for single mode operation, though multi-mode operation is suitable as well. The structure 100 is only exemplary in nature and may be considered part of a larger structure. The structure 100 depicts only portions of the waveguides 102 and 104. In portions not shown, the waveguides 102 and 104 may be coupled to optical fibers, resonators, other waveguides, and the like for receiving and/or transmitting optical signals. The structure 100 may also represent one of a plurality of die cut from a wafer. Moreover, the optical waveguide structure 100 is preferably a PLC structure, and as such, FIG. 1 may depict an optical component in a PLC substrate or a portion of a large-scale integrated optical chip formed using PLC technology. In fact, for explanatory purposes, the portions of the waveguides 102 and 104 shown may be considered operative waveguide portions 103 and 105, respectively, the term operative being used because etched structures will be formed near or above these portions of the waveguides 102 and 104.

By way of example, and not limitation, the waveguides 102 and 104 are shown formed above a first layer, or substrate, 106 that exists below a second layer 108. In the depicted configuration, the second layer 108 is commonly known as an under cladding layer. The structure 100 is preferably formed using a silica-on-silicon fabrication process, where the substrate layer 106 is formed of silicon, e.g., a silicon wafer, and the under cladding layer 108 is a silicon oxide layer. In this configuration, multiple structures 100 may be formed on a single wafer and diced into individual dies. The waveguides 102 and 104 are disposed within an over (or upper) cladding layer 110, which in the preferred embodiment is formed of a silicon oxide doped with phosphorus and boron and has an index of refraction differential with that of the waveguides 102 and 104 to allow total internal reflection propagation of signals within the waveguides 102 and 104. While in the preferred example, the structure 100 is formed using a silica-on-silicon process, other fabrication processes may be used. In addition, other substrate, under cladding, and over cladding layer materials may be used in place of those described above. Suitable materials will be known to persons of ordinary skill in the art.

The structure 100 may be formed through any suitable PLC fabrication technique, with fabrication by a combination of flame hydrolysis deposition (FHD) and reactive ion etching (RIE) being preferred. Other processes such as chemical vapor deposition (CVD) are suitable. An exemplary formation process includes the deposition of the under cladding layer 108 and a layer of core material. After the deposition of these two layers, the wafer structure is heated to a high temperature for a consolidation. The desired optical circuit pattern, e.g., the pattern to form the waveguides 102 and 104, is fabricated in the core layer through a photolithography and RIE process. An over cladding layer. such as layer 110, is then formed over the patterned structure and a subsequent consolidation may be performed. Persons of ordinary skill in the art will recognize other processing steps that may be added to, substituted for, or removed from the above. For example, a chemical or mechanical polishing step may be performed on the under cladding layer 108, core layer, and over cladding layer 110 after their respective depositions.

As described above, the state of the art PLC fabrication processes are incapable of forming Bragg gratings in waveguides without requiring any adjacent waveguides to be a substantial distance from the waveguide in which the Bragg grating is to be formed. Further, state of the art processes are incapable of forming tunable Bragg gratings using an UV exposure process. FIGS. 2–7 depict solutions to both of these problems.

Figure 2:
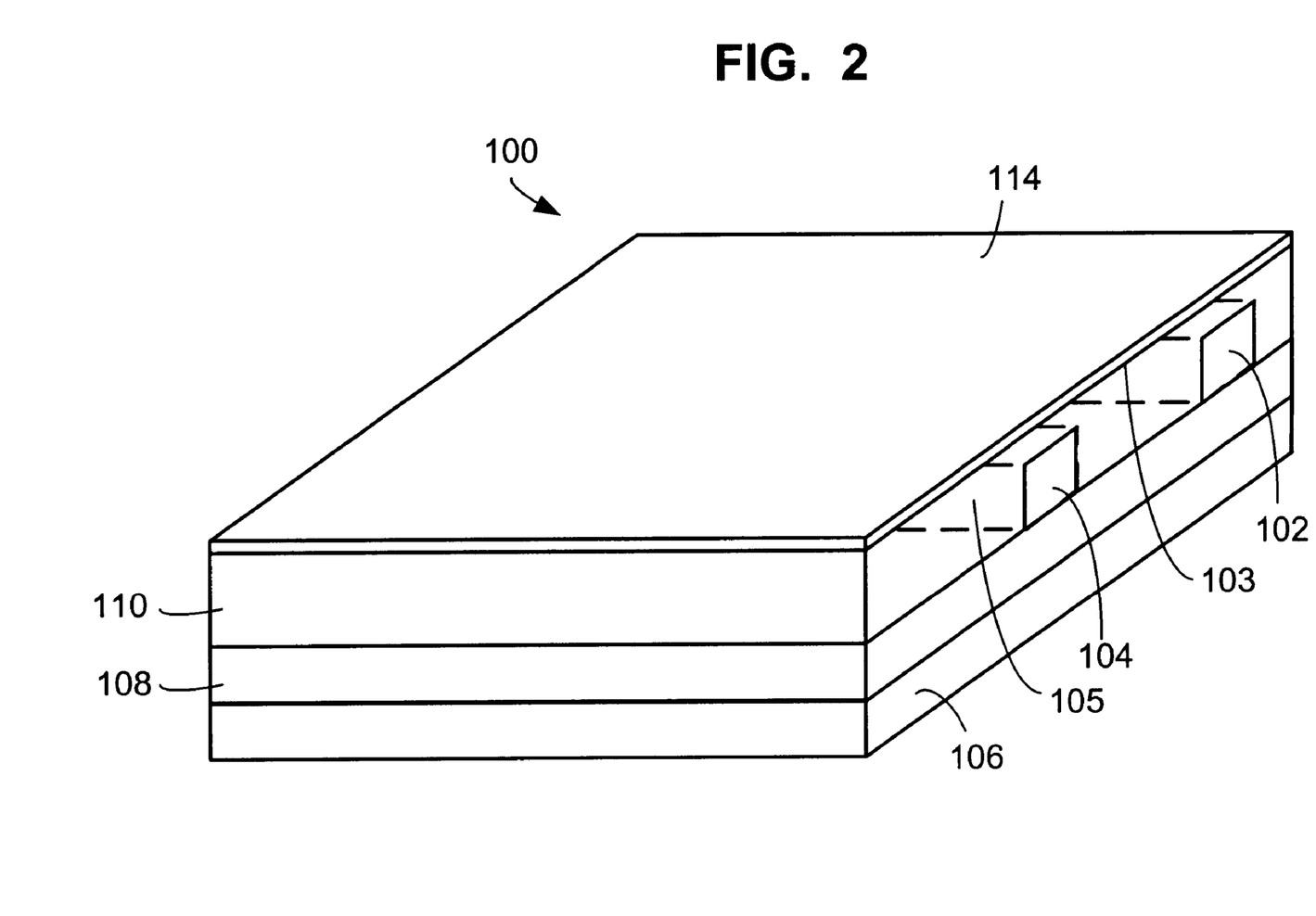
FIG. 2 is a view of the optical substrate to FIG. 1 after a metallic layer has been deposited thereon.

In FIG. 2, the structure 100 has been exposed to a metal deposition to form a metallic layer 114. The metallic layer 114 in the preferred example is formed over an entire top surface 112 of the structure 100 to simplify fabrication. If structure 100 is part of a batch fabrication on a wafer, the metallic layer 114 would be preferably deposited over the entire wafer, for example. The metallic layer 114 may be formed of any metal typically used in PLC fabrication processes, preferably metals compatible with silica-on-silicon processing, of which Al and Cr are examples. In some cases, the metallic layer consists of two layers: a conductive metallic layer, e.g., Al; and a resistive metallic heater layer, e.g., Cr.

The metallic layer 114 is subsequently patterned, e.g., using known photoresist, exposure, and development processes. This patterning is used to form, generally, two types of structures from the metallic layer 114, passive metallic elements and metallic heaters. Metallic heaters may include a resistive metal area in proximity of a waveguide and conductive metal areas interconnecting the metallic heaters to pads for control through external electric circuits. Passive metallic elements can be formed of either resistive or conductive metal layers.

Figure 3:
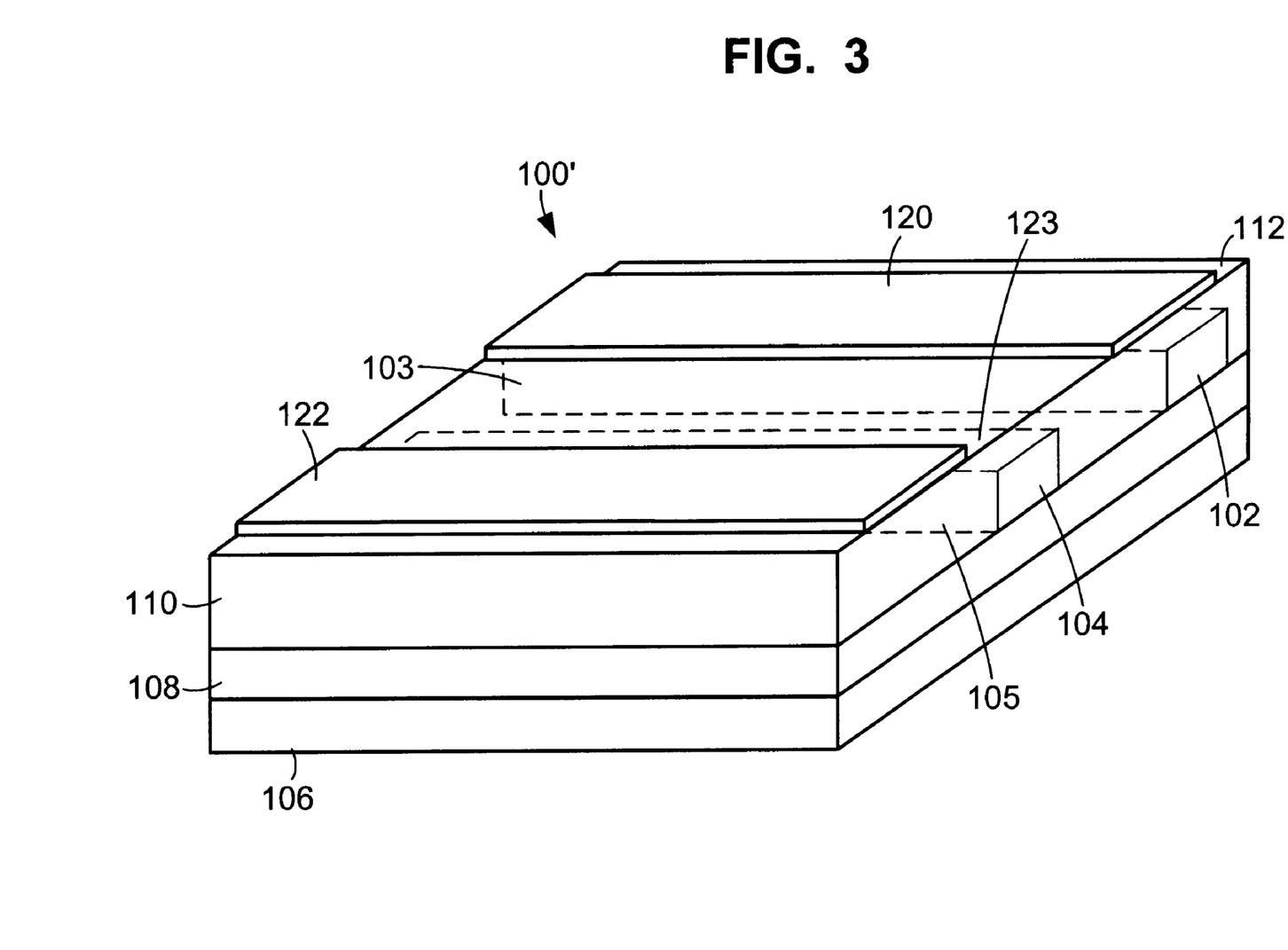
FIG. 3 is a view of the optical substrate of FIG. 2 after the metallic layer has been etched.

FIG. 3 shows an exemplary structure wherein the metallic layer 114 has been etched to form a first metallic structure 120 and a second metallic structure 122. The resulting structure is labeled 100'. Metallic structure 120 is formed on the top surface 112 and, by way of example, covers the entire portion of the waveguide 102 depicted, i.e., the metallic structure 120 entirely covers the operative portion 103. In this configuration, the etched metallic structure 120 serves as a passive metallic structure. In contrast, the etched metallic structure 122, also disposed on the top surface 112, is positioned to the side of the waveguide 104 and to the side of operative region 105, leaving an exposed top surface 123 of the waveguide 104. In this position, the metallic structure 122 may function as a metallic heater.

With the patterning and etching steps completed on the metallic layer 114, a UV exposure is performed on the exposed top surface 123 to form a Bragg grating in the operative portion 105 of the waveguide 104. The grating may be formed in the waveguide 104 through a technique such as lithographically defining the grating and etching the same. However, in the preferred example, a photochemical process, i.e., a UV exposure process as would be known in the art, is used. This process may result from direct exposure of two laser beams forming an interference pattern at the top surface 112, or, in the preferred example, through the use of a phase mask, like a quartz plate with a periodic iron step, which under illumination forms +1 and −1 diffractive orders at the top surface 112. Excimer lasers are exemplary suitable sources of UV radiation.

While Bragg gratings are often formed with a uniform index varying profile, techniques have been developed to form apodized Bragg gratings having a step-wise profile or a Gaussian profile. Apodized Bragg gratings offer a narrower reflectivity bandwidth and, therefore, improved filtering over non-apodized gratings. Exemplary apodized Bragg grating formation techniques, in particular techniques that eliminate the chirp induced by simple apodization techniques, include (1) scanning a UV beam across a phase mask and dithering the phase mask as the scanning beam departs from the center of the beam and (2) using a variable groove depth phase mask during the UV exposure. The latter technique has been shown to allow for channel spacings of 0.8 nm with 30–40 dB channel isolation in WDM systems. Other Bragg grating profile designs have been shown as well and are suitable. In any event, the structures and methods described herein are compatible with UV exposure techniques that form non-apodized, as well as the various apodized grating techniques, with apodized gratings being preferred.

Figure 4:
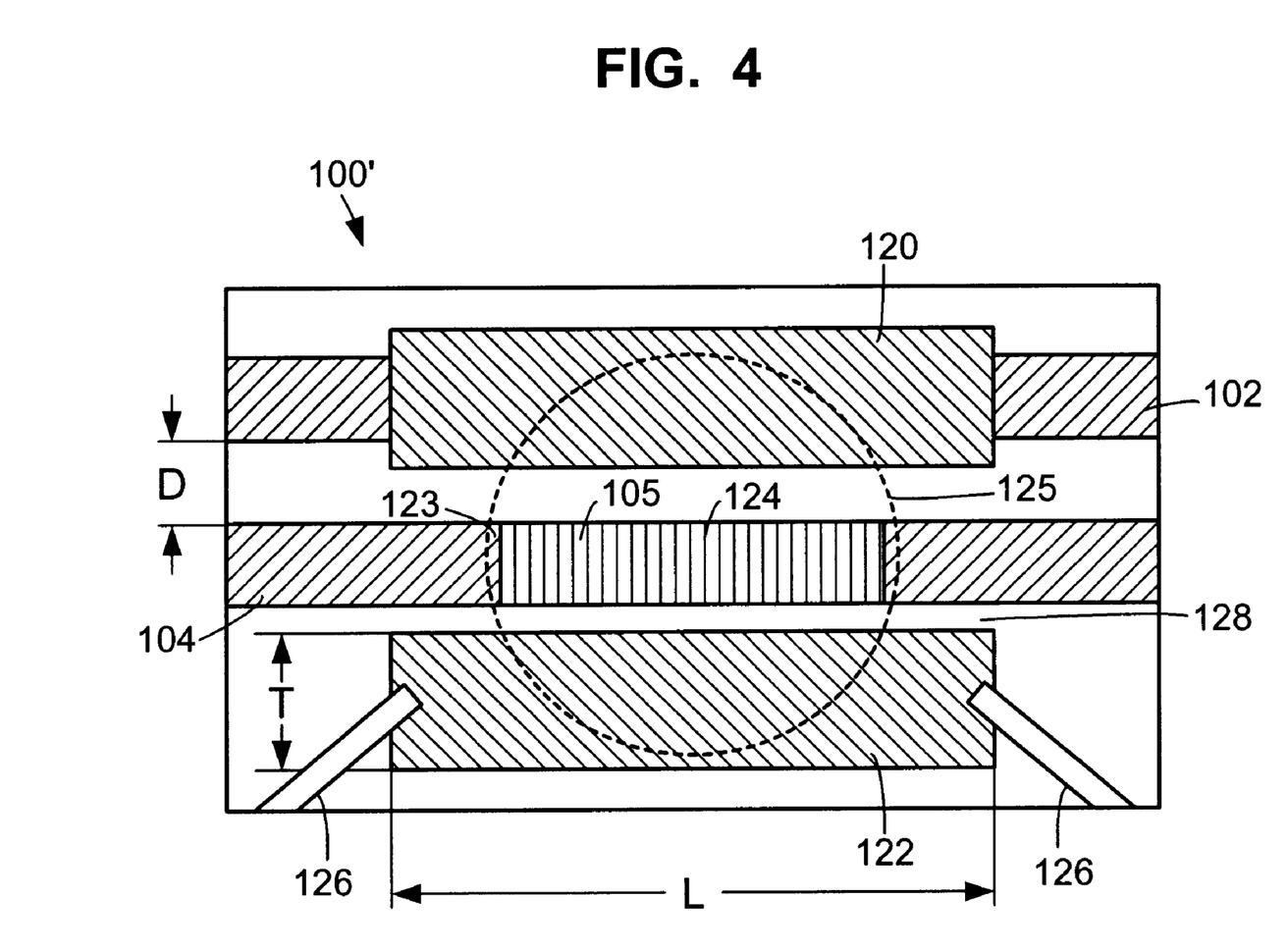
FIG. 4 is a plan view of the optical substrate of FIG. 3 with a Bragg grating formed in one of the two waveguides.

UV exposure in a PLC fabrication process limited the resolution of state of the art devices. With the structure 100' of FIG. 3, now a UV exposure process may be performed over the waveguide 104, while at the same time, the passive metallic structure 120 protects the adjacent waveguide 102 during such exposure. The cladding layer 110 is typically unaffected by the UV exposure process due to the lack of photosensitive dopants. Thus, structure 100' protects any waveguide within a separation distance to the Bragg grating waveguide (104) from being detrimentally altered during the UV exposure process, even when that separation distance is within an UV spot size. The term "UV spot size" refers to the distance over which photosensitive regions in a substrate would be simultaneously affected during a UV exposure. FIG. 4 shows an expanded top view of the structure 100' with a Bragg grating 124 formed in waveguide 104. As can be seen, the passive metallic structure 120 is positioned over the operative portion 103 (hidden and not shown) to block that portion of an UV exposure spot 125 that extends over waveguide 104 during the UV writing of the grating 124. As a result, the UV spot 125 only forms a Bragg grating over operative portion 105 of waveguide 104. In the preferred example, the Bragg grating 124 is an apodized grating having a Gaussian or raised Gaussian profile, as apodized gratings are preferred in WDM systems.

The metallic structure 122 is formed adjacent to the waveguide 104 and in particular adjacent to the operative region 105 in which the Bragg grating 124 is formed. The metallic structure 122 has metal interconnects 126 which may be formed either during the patterning of layer 114 or through other known fabrication steps or techniques, such as, forming after the etch of layer 114, or forming through a two metallic layer technique as described in FIGS. 6 and 7. The interconnects 126 are used to connect the metallic structure 122 to a voltage source for driving the metallic structure 122 as a metallic heater. The interconnects 126 may be terminated with wire bond pads. Preferably, however, the structure 100' would be mounted to a printed circuit board having the desired control circuitry, and the interconnects 126 would be terminated for control through the printer circuit board in a known manner. In any event, the interconnects 126 are connected across a voltage source, e.g., a +3 V high side and +0 V low side, for driving as a heater.

When driven by the appropriate voltage, the metallic heater 122 serves as a heater to heat a temperature tuned region 128 that extends adjacently from at least the operative portion 105 and that extends at least partially under the metallic heater 122. Heating the region 128 heats the Bragg grating 124, and this in turn affects the index of refraction within the alternating layers of the grating 124 and results in a change to the resonant frequency of the grating 124. The resonant frequency is the frequency the Bragg grating 124 is designed to filter and is related to the grating period through known relationships. By varying the amount of voltage applied across the metallic heater 122, the resonant frequency of the grating 124 can be adjusted across a range of values. That is, by selectively controlling the voltage across metallic heater 122, the grating 124 is tuned to filter a desired wavelength.

The metallic heater 122 is formed of a thickness, T, and width W chosen such that the metallic heater 122 has a desired resistance value based upon the range of driving voltages to be used and the desired temperature change in the region 128 to be affected therefrom. Additionally, the length of the metallic heater 122, L, may coincide with the length of the Bragg grating 124 along the propagation axis of the waveguide 104. The metallic heater 122 may be shorter, equal to, or preferably slightly longer than the length of the grating 124 to ensure uniform temperature change along the entire length of the grating 124.

As can be seen from FIG. 4, with a metallic structure 120 serving as a passive metallic structure protecting adjacent waveguide 102 during Bragg grating formation, the waveguides 104 and 102 can be formed much closer together than was previously achievable. Whereas the separation distance between such waveguides was previously limited to the UV exposure spot size, e.g., 50 $\mu$m, the separation distance, D, between waveguides can be much smaller than 50 $\mu$m with the presently disclosed techniques. In other words, the separation distance, D, is (within the UV spot size for the system. For example, the separation distance, D, may now be within an evanescent coupling distance, i.e.. a distance sufficient for evanescing coupling of a signal propagating in waveguide 104 into 102. Further, if multiple waveguides are within an UV spot size to the waveguide 104, or in the example of FIGS. 1–4 within an UV spot size to the operative waveguide portion 105, then multiple-passive metallic structures would be formed or the passive metallic structure 120 would extend over each of the operative portions in the nearby waveguides.

It will be appreciated that a great many optical devices including large-scale integrated PLCs, or optical chips, can be formed from the above described techniques. Indeed the two waveguide structures of FIGS. 1–4 are only exemplary shown as they may be considered common elements to a great many optical devices.

Figure 5:
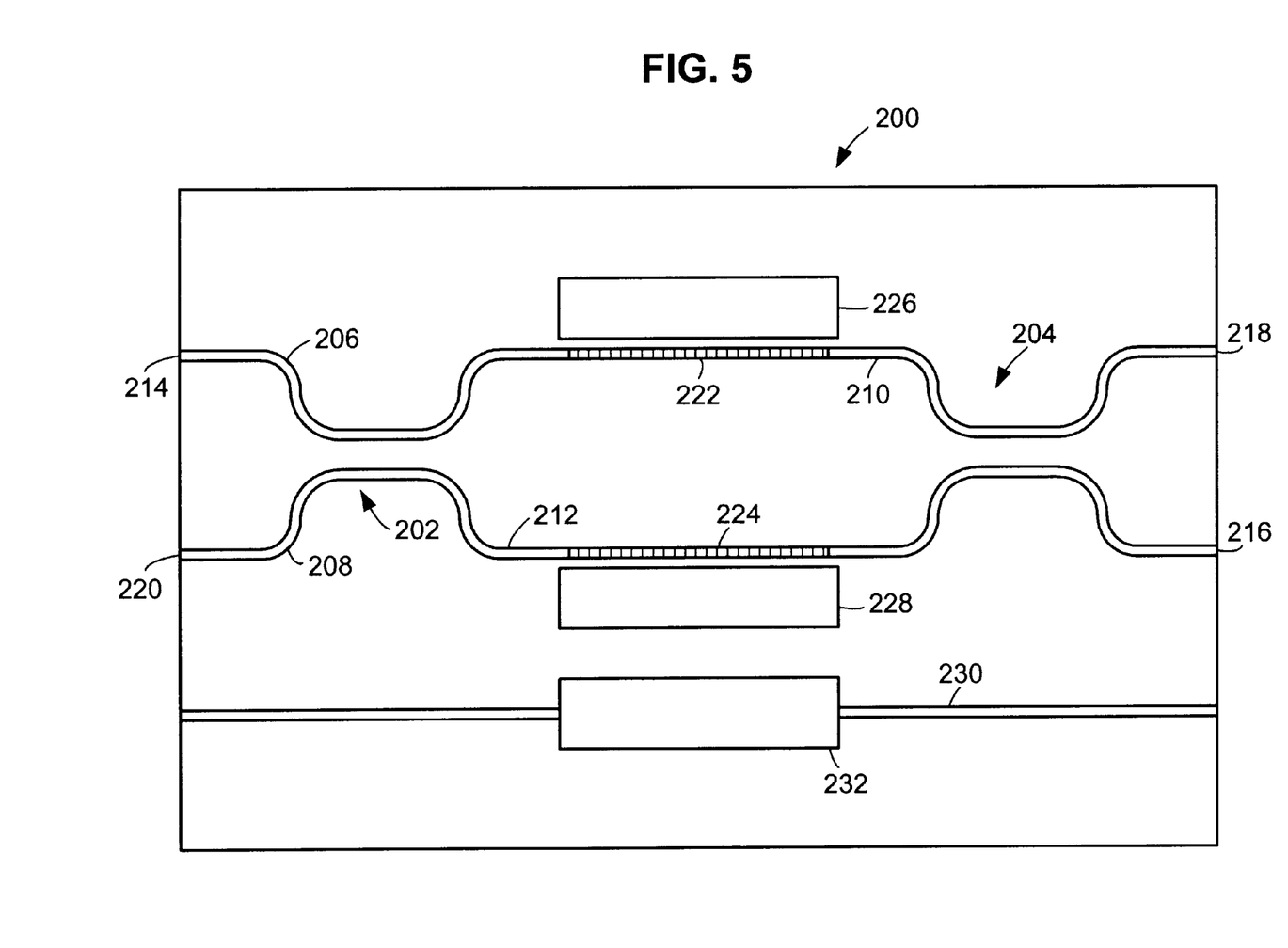
FIG. 5 is a plan view of an optical substrate containing an optical circuit employing tunable Bragg gratings.

FIG. 5 shows one multiple waveguide device in the form of an optical device known as a Mach-Zehnder interferometer (MZI) 200. Mach-Zehnder interferometers are known and have been used to form optical switches and add/drop multiplexers. Mach-Zehnder interferometers offer many advantages for optical networks including low insertion loss, signal format transparency, polarization-insensitive operation, long term stability, capacity for large scale integration and is suitable for mass production.

The MZI 200 has a first coupler 202 and a second coupler 204, both of which are 3 dB directional couplers, or 50-50 couplers, in the preferred example, though other coupling ratios and non-identical coupling ratios are contemplated. The couplers 202 and 204 are formed from two waveguides 206 and 208, and the two couplers 202 and 204 are connected by waveguide arms 210 and 212, where waveguide arm 210 is part of the waveguide 206 and waveguide arm 212 is part of the waveguide 208. As is known, by controllably adjusting the phase difference between waveguide arms 210 and 212, the MZI 200 can be made to switch a signal from one waveguide to the other. For example, a signal received at the input port 214 can be switched to output port 216 with the proper phase difference between waveguide arms 210 and 212. In such a configuration, input port 214 is termed an input or bar port and output 216 is termed a cross port. Similarly, as the MZI 200 offers bidirectional operation. port 218 may form an input port to the output port, or cross port, 220.

Each of the waveguide arms 210 and 212 include Bragg gratings 222 and 224, respectively. These Bragg gratings are formed using any of the previously described UV exposure processes and may be formed individually or contemporaneously during the same UV exposure step. With Bragg gratings 222 and 224, the MZI 200 can provide wavelength-selective switching. The Bragg grating 222, for example, being characterized by a first resonant frequency, will pass all frequencies outside of the resonant frequency band and reflect signals within the resonant frequency band for output at port 220. Bragg rating 224 acts in a similar fashion for signals input to port 216 or 220.

The MZI 200 has a first metallic heater 226 and a second metallic heater 228 formed near the Bragg gratings 222 and 224, respectively. The metallic structures 226 and 228 are formed through processes described herein. The metallic structures 226 and 228 will heat temperature tuned regions at the Bragg gratings 222 and 224, respectively, which tunes the characteristic resonant frequencies of the gratings 222 and 224. Each metallic structure 226 and 228 is individually controlled through interconnects (not shown) and, therefore, each arm 210 and 212 is tunably controllable to filter distinct wavelengths. Such tunability is particularly useful in WDM systems and wavelength-selective devices like add/drop multiplexers, in which a single device should be able to controllably filter any of the propagating channels which are centered at different wavelengths. In addition to the metallic heaters 226 and 228, separate metallic structures may also be used to controllably induce a desired phase shift in one or both of the arms 210 and 212. Such metallic structures may be formed directly over a top surface of the waveguide arm (210 and/or 212) or over a region adjacent to the top surface thereof. Further, these metallic structures would be controlled through a controllable voltage source, for example through a printed circuit board. Further still, to simplify device formation, such metallic structures are preferably formed during the fabrication of the metallic heaters 226 and 228.

Based on this disclosure, numerous alternatives to the MZI 200 will be apparent to persons of ordinary skill in the art. For example, while two metallic structures 226 and 228 are shown, a single metallic structure serving as a heater for one of the Bragg gratings may be alternatively used. Similar to that described previously with respect to FIGS. 3 and 4, the MZI 200 may be part of a large-scale integrated optical chip in which other waveguides and optical devices are fabricated within an UV spot size to the waveguides 206 and/or 208. By way of example, another waveguide 230 that may or may not be coupled to the MZI 200 is shown with a passive metallic structure 232 formed over an operative portion thereof to prevent the same from being altered during the UV exposure process.

Figure 6:
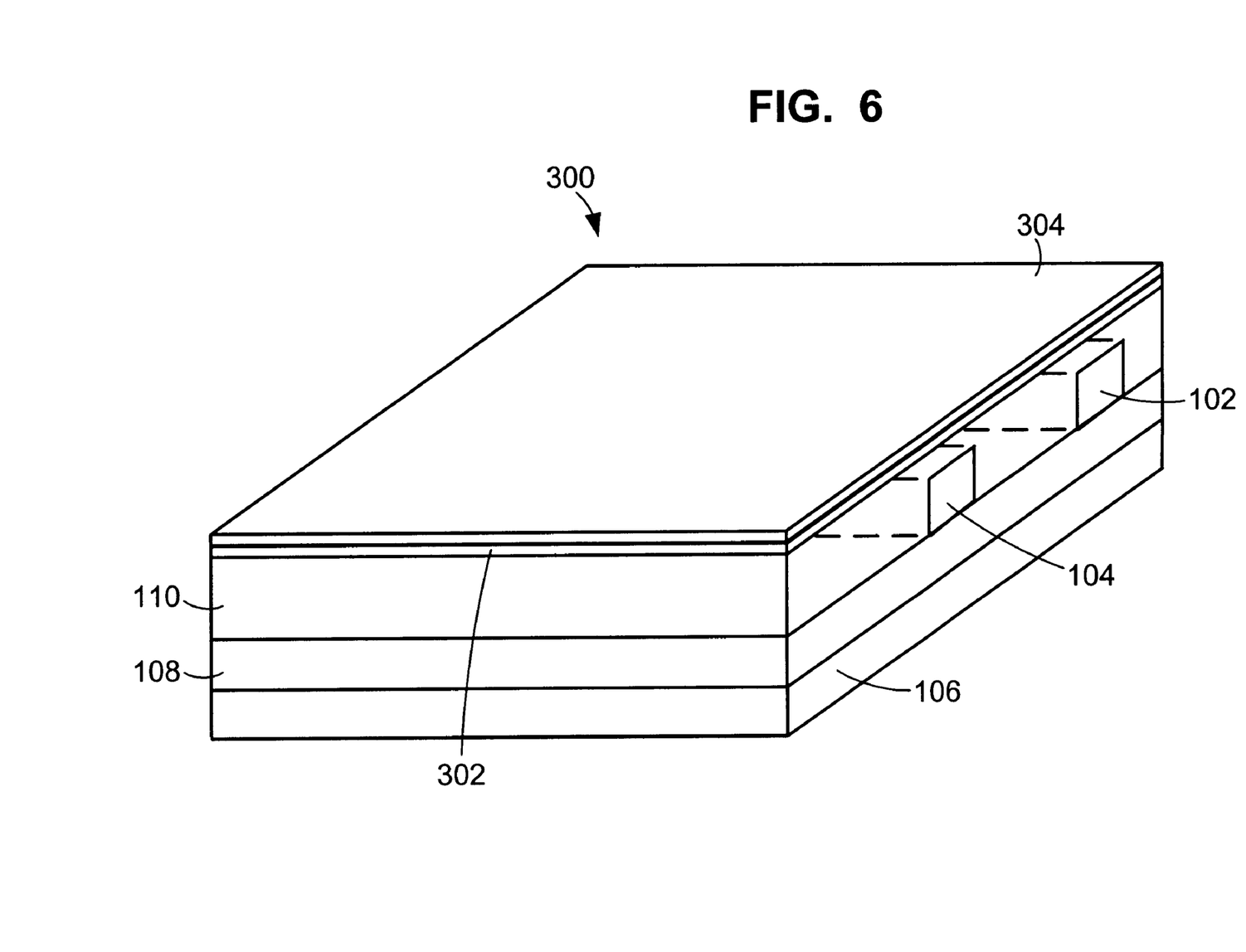
FIG. 6 is an alternative example to that shown in FIG. 2 and demonstrates two metallic layers.
Figure 7:
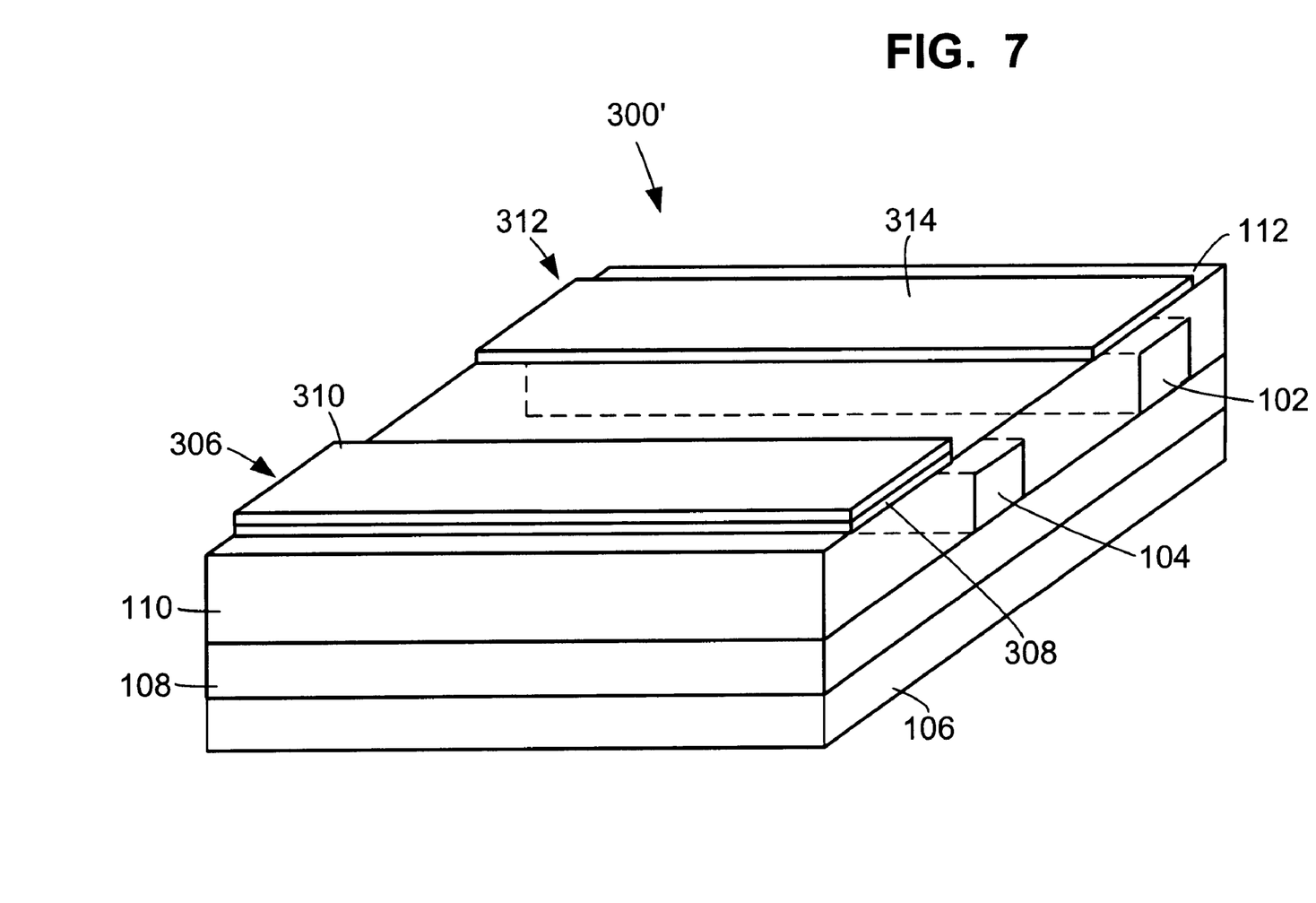
FIG. 7 is an alternative example to that shown in FIG. 3 and demonstrates metallic structures formed from the two metallic layers of FIG. 6.

The techniques described above are exemplary in nature. FIGS. 6 and 7 show an alternative exemplary optical waveguide structure 300 formed from the structure 100 in FIG. 1. Here a first metallic layer 302 is deposited over the entire top surface 112 of the structure 100. The metallic layer 302 is preferably formed of a high resistance metal, such as a Cr-based metal. The second metallic layer 304 is deposited on top of metallic layer 302, and is preferably formed of a highly conductive metal, such as an Al-based metal. Both layers 302 and 304 are formed through known metal deposition techniques. Subsequent to the deposition of layers 302 and 304, an etching process is performed to create the desired passive metallic structure and metallic heater.

FIG. 7 shows the structure of FIG. 6, labeled 300', after the etch. The patterning and etching are-slightly different than those described above with respect to FIG. 3, in that a metallic heater 306 is patterned and protected during the etching process so that it includes a high resistance portion 308 and a low resistance, or highly conductive, portion 310. The portion 310 is connected to interconnects and driven by a controlled voltage source. The dual portions allow for the heater 306 to be more easily driven for changing the temperature in the temperature tuned region 128. A passive metallic structure 312, not needing a highly conductive metal, has been patterned and etched to remove the portion of metallic layer 304 above a highly resistive portion 314 which forms the passive metallic structure 312. An UV exposure process is performed to form a Bragg grating in the waveguide 104, as described above. Numerous other alternatives will be apparent. For example, the second metallic layer 304 may alternatively be formed over only that portion of the metallic layer 302 coinciding with the metallic heater to be formed through etching. Further, more than two metallic layers may be formed and pattern etched if desired. Any of the structures previously described may be formed through this multi-layer metallic deposition and etching process.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of forming a Bragg grating in a primary waveguide within a substrate, the primary waveguide having an operative portion and the substrate having a temperature tuned region adjacent the operative portion of the primary waveguide, the method comprising:

forming a metallic heater on a top surface of the substrate over the temperature tuned region to expose a surface of the operative portion of the primary waveguide; and applying an UV exposure to the exposed surface of the operative portion to form the Bragg grating in the primary waveguide.

2. The method of claim 1, wherein the substrate comprises an adjacent waveguide having an operative portion near the operative portion of the primary waveguide, the method further comprising:

forming a passive metallic structure over the operative portion of the adjacent waveguide to protect the operative portion of the adjacent waveguide during the application of the UV exposure.

3. The method of claim 2, wherein forming the metallic heater further comprises forming the metallic heater to have a first resistive portion and a conductive portion.

4. The method of claim 3, wherein forming the passive metallic structure further comprises forming the passive metallic structure to have a second resistive portion, the second resistive portion and the first resistive portion being formed from a single resistive metallic layer.

5. The method of claim 1, further comprising:

forming interconnects on the top surface of the substrate connected to the metallic heater;

coupling the interconnects to a controllable voltage source; and controllably altering the voltage of the controllable voltage source to alter a resonant frequency of the Bragg grating.

6. The method of claim 1, wherein the operative portion of the primary waveguide is with a separation distance to the operative portion of the adjacent waveguide that is less than approximately 50 $\mu$m.

7. A method of forming a Bragg grating in an operative portion of a first waveguide in a substrate that has a top surface and that has a second waveguide disposed such that an operative portion of the second waveguide is within a separation distance to the operative portion of the first waveguide that is less than or equal to the UV spot size, the method comprising:

depositing a first metallic layer on the top surface;

etching the first metallic layer to form a passive metallic structure over the operative portion of the second waveguide and to expose the operative portion of the first waveguide; and exposing the top surface to an UV exposure to form the Bragg grating in the operative portion of the first waveguide.

8. The method of claim 7, further comprising etching the first metallic layer to form a metallic heater over a temperature tuned region adjacent the operative portion of the first waveguide.

9. The method of claim 8, further comprising:

forming interconnects along the top surface and connected to the metallic heater;

coupling the interconnects to a controllable voltage source; and controllably altering the voltage of the controllable voltage source to alter the temperature of the substrate within the temperature tuned region.

10. The method of claim 8, further comprising:

depositing a second metallic layer over the first metallic layer, the second metallic layer having a higher conductivity than the first metallic layer; and etching the second metallic layer and the first metallic layer to form the metallic heater, so that the metallic heater is formed of at least a portion of the second metallic layer and a portion of the first metallic layer.

11. The method of claim 7, wherein the separation distance is less than approximately 50 $\mu$m.

12. The method of claim 7, wherein exposing the top surface of the substrate to form the Bragg grating comprises forming the Bragg grating so that the Bragg grating is apodized.

13. An optical device comprising:

a first waveguide having an operative portion;

a second waveguide having a Bragg grating formed in an operative portion of the second waveguide, the Bragg grating being formed by exposing the operative portion of the second waveguide to an UV exposure, the operative portion of the second waveguide being within a separation distance to the operative portion of the first waveguide that is less than or equal to an UV spot size; and a passive metallic structure formed over the operative portion of the first waveguide to protect the operative portion of the first waveguide during the exposing of the operative portion of the second waveguide to the UV exposure.

14. The optical device of claim 13, wherein the separation distance is less than 50 $\mu$m.

15. The optical device of claim 13, wherein the separation distance is within an evanescent coupling distance for a signal propagating within the first waveguide.

16. The optical device of claim 13, further comprising:

a temperature tuned region adjacent to the operative portion of the second waveguide; and a metallic heater formed over the temperature tuned region to controllably tune the Bragg grating.

17. The optical device of claim 16, wherein the metallic heater comprises a first conductive metallic portion and a second high resistance metallic portion.

18. The optical device of claim 13, wherein the Bragg grating is apodized.

19. A planar lightwave circuit comprising:

a first waveguide disposed in a substrate, the first waveguide having an operative portion and a temperature tuned region extending from the operative portion of the first waveguide into the substrate;

a Bragg grating formed in the operative portion of the first waveguide and having a resonant frequency, the Bragg grating being formed using an UV exposure process; and a metallic heater disposed above the temperature tuned region and having interconnects to drive the metallic heater to tune the resonant frequency, the metallic heater being formed by depositing and etching a metallic layer above the substrate, where said depositing and etching occurs before the UV exposure process, the metallic heater being positioned so as to expose a top surface of the operative portion of the first waveguide to the UV exposure process.

20. The planar lightwave circuit of claim 19, wherein the Bragg grating is apodized.

21. The planar lightwave circuit of claim 19, further comprising:

a second waveguide having an operative portion within a separation distance to the operative portion of the first waveguide, where the separation distance is within an UV spot size; and a passive metallic structure disposed above the operative portion of the second waveguide to protect the operative portion of the second waveguide during the UV exposure process.

22. In a planar lightwave circuit, an optical device comprising:

a first waveguide having an operative portion;

a second waveguide having an operative portion within a separation distance to the operative portion of the first waveguide, the separation distance being within an UV spot size;

a Bragg grating formed in the operative portion of the first waveguide, the Bragg grating having a resonant frequency;

a metallic heater disposed over a temperature tuned region adjacent to the operative portion of the first waveguide to controllably tune the resonant frequency in response to changes to a driving voltage applied to the metallic heater; and a passive metallic structure disposed over the operative portion of the second waveguide.

23. The optical device of claim 22, wherein the separation distance is less than approximately 50 µm.

24. The optical device of claim 22, wherein the metallic heater comprises a first conductive metallic portion and a second high resistance metallic portion.

25. The optical device of claim 22, wherein the Bragg grating is apodized.

26. The optical device of claim 22, wherein the Bragg grating is formed by exposing the operative portion of the second waveguide to an UV exposure.

27. A planar lightwave circuit optical coupler comprising:

a first waveguide having an operative portion;

a second waveguide evanescently coupled to the first waveguide and having an operative portion;

a first Bragg grating formed in the operative portion of the first waveguide, the first Bragg grating having a first resonant frequency; and a first metallic heater disposed over a first temperature tuned region adjacent to the operative portion of the first waveguide to controllably tune the first resonant frequency in response to changes to a driving voltage applied to the first metallic heater, the first metallic heater disposed such that a top surface of the first waveguide is exposed.

28. The planar lightwave circuit optical coupler of claim 27, further comprising:

a second Bragg grating formed in the operative portion of the second waveguide, the second Bragg grating having a second resonant frequency; and a second metallic heater disposed over a second temperature tuned region adjacent to the operative portion of the second waveguide to controllably tune the second resonant frequency in response to changes to a driving voltage applied to the second metallic heater.

29. The planar lightwave circuit optical coupler of claim 27, further comprising:

a third waveguide having an operative portion within a separation distance to either the first waveguide or the second waveguide, wherein the separation distance is within an UV spot size; and a passive metallic structure disposed over the operative portion of the third waveguide.

30. The planar lightwave circuit optical coupler of claim 27, wherein the first waveguide and the second waveguide are in a Mach-Zehnder configuration.

* * * * *